(12) United States Patent
Lo et al.

(10) Patent No.: US 11,599,334 B2
(45) Date of Patent: Mar. 7, 2023

(54) ENHANCED MULTIPLY ACCUMULATE DEVICE FOR NEURAL NETWORKS

(71) Applicants: VeriSilicon Microelectronics (Shanghai) Co., Ltd., Shanghai (CN); VeriSilicon Holdings Co., Ltd., George Town (KY)

(72) Inventors: Mankit Lo, San Jose, CA (US); Meng Yue, Shanghai (CN); Jin Zhang, Shanghai (CN)

(73) Assignees: VeriSilicon Microelectronics, Shanghai (CN); VeriSilicon Holdings Co., Ltd., George Town (KY)

( * ) Notice: Subject to any disclaimer, the term of this patent is extended or adjusted under 35 U.S.C. 154(b) by 273 days.

(21) Appl. No.: 16/897,201

(22) Filed: Jun. 9, 2020

(65) Prior Publication Data

US 2021/0382690 A1    Dec. 9, 2021

(51) Int. Cl.
*G06F 7/544* (2006.01)
*G06N 3/04* (2006.01)

(52) U.S. Cl.
CPC ............. *G06F 7/5443* (2013.01); *G06N 3/04* (2013.01)

(58) Field of Classification Search
CPC ................................ G06F 7/5443; G06N 3/04
See application file for complete search history.

(56) References Cited

U.S. PATENT DOCUMENTS

| 5,657,262 | A | 8/1997 | Curtet |
| 2002/0161813 | A1 | 10/2002 | Chiueh et al. |
| 2018/0157465 | A1* | 6/2018 | Bittner ............... G06F 7/52 |

FOREIGN PATENT DOCUMENTS

| EP | 161089 | 11/1985 |
| EP | 1102161 | 5/2001 |
| EP | 890899 | 2/2004 |
| EP | 1614027 | 9/2009 |

* cited by examiner

*Primary Examiner* — Michael D. Yaary
(74) *Attorney, Agent, or Firm* — David R. Stevens; Stevens Law Group (57) ABSTRACT

A device for performing multiply/accumulate operations processes values in first and second buffers and having a first width using a computational pipeline with a second width, such as half the first width. A sequencer processes combinations of portions (high-high, low-low, high-low, low-high) of the values in the first and second buffers using a multiply/accumulate circuit and adds the accumulated result of each combination of portions to a group accumulator. Adding to the group accumulator may be preceded by left shifting the accumulated result (the first width for the high-high combination and the second width for the low-high and high-low combination).

14 Claims, 5 Drawing Sheets

ENHANCED MULTIPLY ACCUMULATE DEVICE FOR NEURAL NETWORKS

BACKGROUND

Field of the Invention

This invention relates to systems and methods for performing high volumes of mathematical operations.

Background of the Invention

One of the most common ways to boost speed of execution is to perform operations in parallel, such as in multiple processor cores. This principle is exploited on a much larger scale by configuring graphics processing units (GPUs) with many (e.g., many thousands) of processing pipelines that may each be configured to perform a mathematical function. In this manner, large amounts of data may be processed in parallel. Although originally used for graphics processing applications, GPUs are also often used for other applications, particularly artificial intelligence.

It would be an improvement in the art to improve the function of a GPU pipeline or of any processing device including many processing units.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
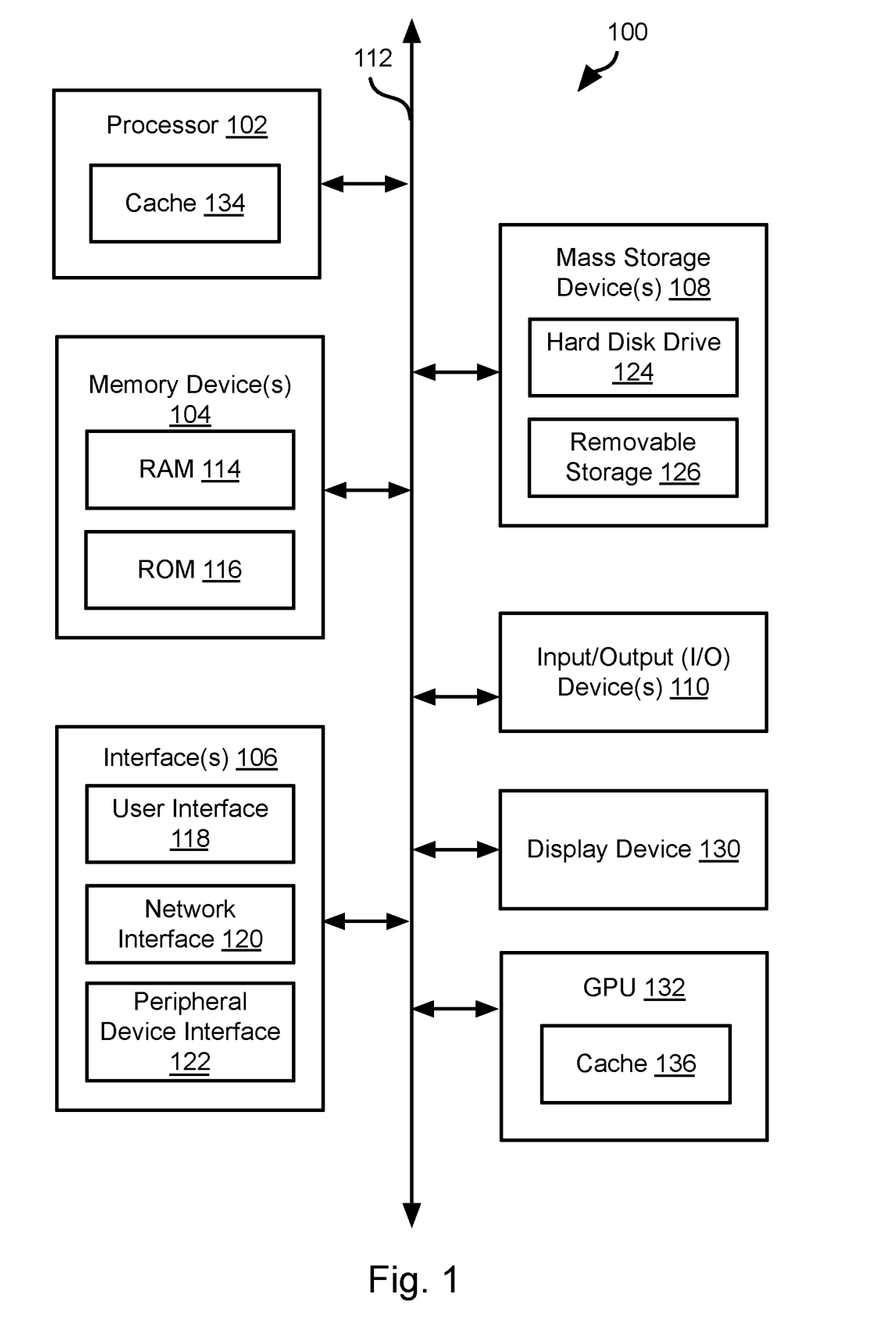
FIG. 1 is a schematic block diagram of a computer system suitable for implementing methods in accordance with embodiments of the invention.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In some embodiments, a processor 102 may include a cache 134, such as one or both of a L1 cache and an L2 cache. A GPU 132 may likewise include a cache 136 that may likewise include one or both of a L1 cache and an L2 cache.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
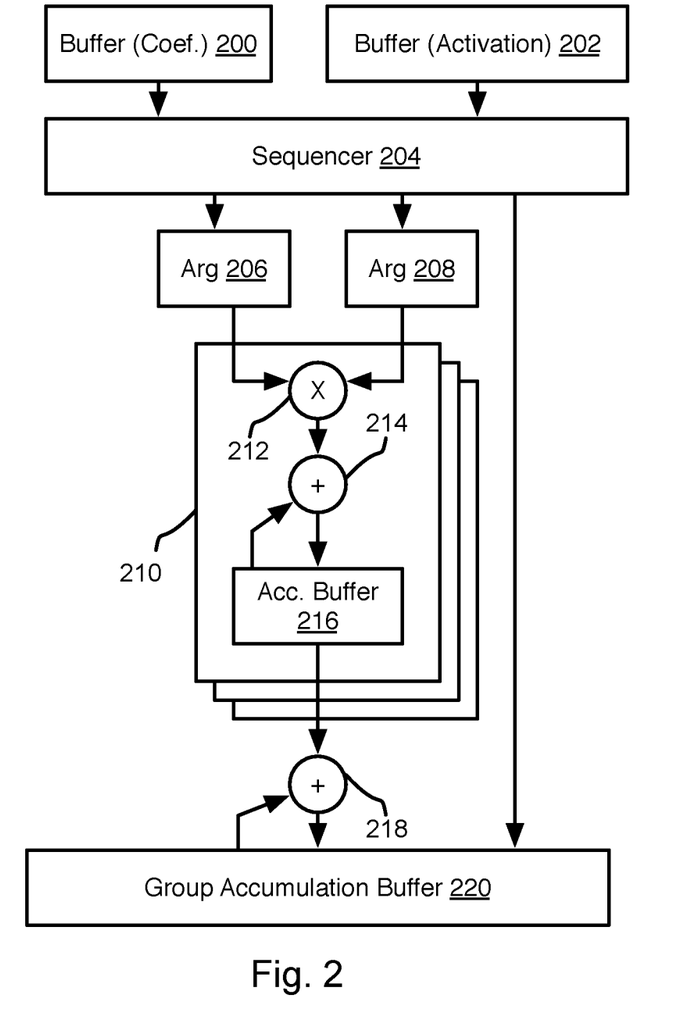
FIG. 2 is a schematic block diagram of a multiply/accumulate circuit in accordance with an embodiment of the present invention.

Referring to FIG. 2, in some embodiments, a GPU 132, processor 102, or other computing device may include or access buffers 200, 202, such as defined in a cache 134, 316, RAM 114, or some other hardware location. Values stored in the buffers 200, 202 have a first width, such as 16 bits. As discussed in detail below, other parts of a computational pipeline of a GPU 132, processor 102, or other computing device, may have a smaller width, such as half of the first width, e.g., 8 bits where the first width is 16 bits. The values stored in the buffers 200, 202 may be values used to implement and apply a convolution neural network (CNN) or other type of neural network. For example, buffer 200 may store coefficients of the CNN whereas buffer 202 stores the activation values for the CNN, e.g., the values being processed according to the CNN. The manner in which the CNN process is performed may be according to any method known in the art with some or all multiply/accumulate operations being performed according to the methods disclosed herein.

A sequencer 204 may read values from the buffers 200, 202 in order to perform a multiply/accumulate operation using the values stored in the buffers 200,202. In particular, the sequencer 204 may output a sequence of arguments 206, 208 that have the second width and are portions of first values from the buffer 200 and second values from the buffer 202. The manner in which the sequencer generates the arguments 206, 208 is described in detail below with respect to FIGS. 3 through 5.

The arguments 206, 208 are input into a computational pipeline 210 that is configured to perform a multiply/accumulate operation. To that end, the pipeline 210 may include a multiplier 212 that multiplies the arguments 206, 208 to produce a product and a summer 214 that adds the product to contents of an accumulation buffer 216 to obtain a sum and writes the sum to the accumulation buffer 216.

As will be discussed in detail below, the contents of the accumulation buffer 216 may be added by an adder 218 to contents of a group accumulation buffer 220 and the result of this addition written to the group accumulation buffer 220. The manner in which this is performed is also described in detail below. The group accumulation buffer 220 may be much wider than the accumulation buffer 216. For example, where the first width is 16 bits, the second width is 8 bits, the group accumulation buffer may have a width of 48 bits whereas the accumulation buffer 216 has a width of 24 bits.

Figure 3:
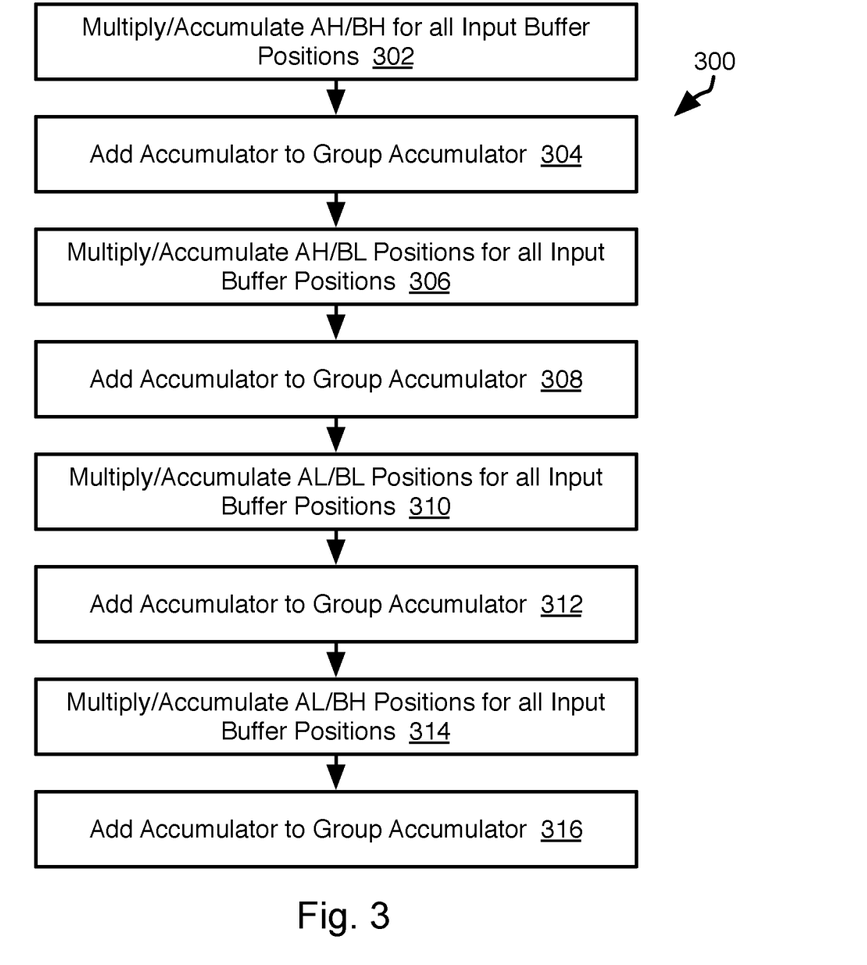
FIG. 3 is a process flow diagram of a method for performing a multiply/accumulate operation for double-width input arguments in accordance with an embodiment of the present invention.
Figure 4:
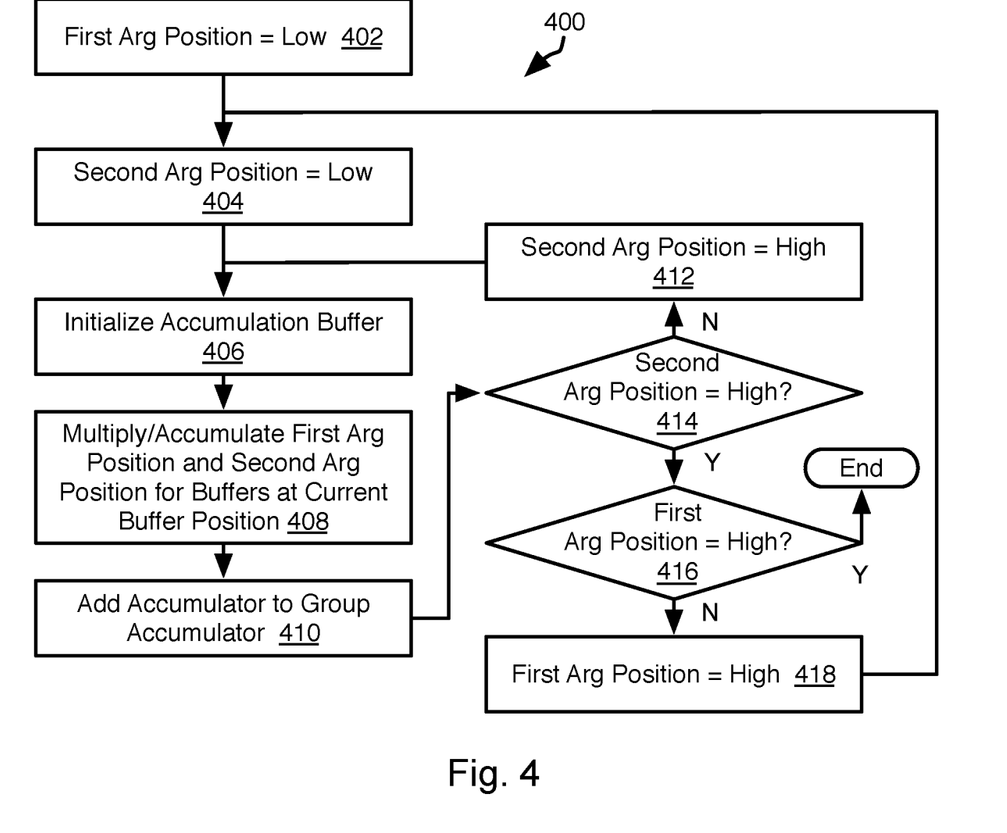
FIG. 4 is a process flow diagram of another method for performing a multiply/accumulate operation for double-width input arguments in accordance with an embodiment of the present invention.
Figure 5:
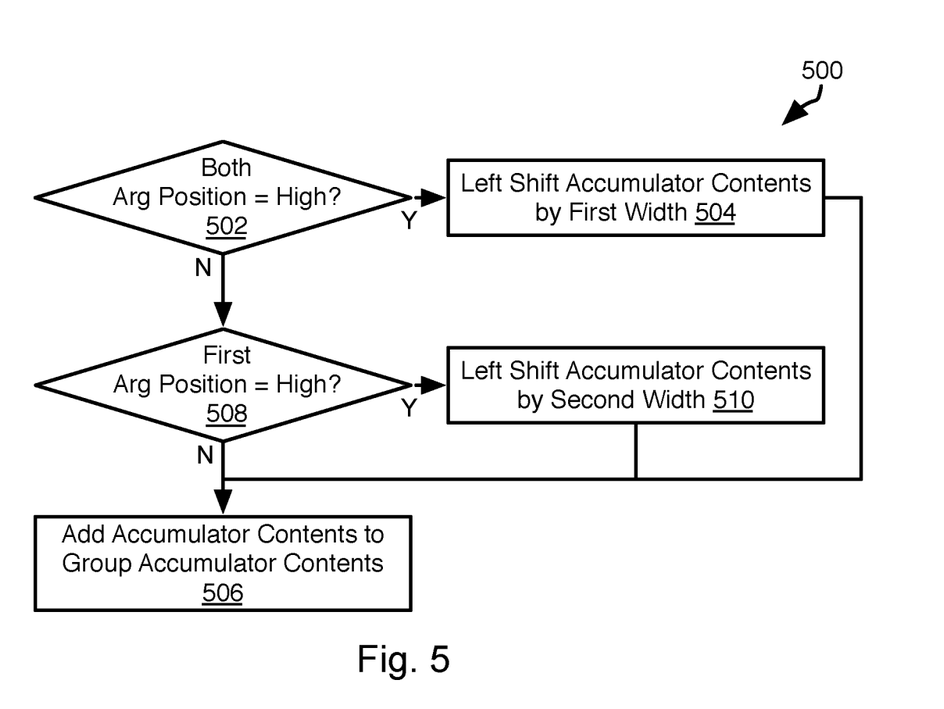
FIG. 5 is a process flow diagram of a method for performing a group accumulation in accordance with an embodiment of the present invention.

The contents of the group accumulation buffer 220, following processing according to the methods of FIGS. 3 through 5, is a result of multiplying pairs of values from the buffers 200, 202 and accumulating them. The contents of the group accumulation buffer 220 may then be used for any purpose desired, such as to implement a CNN or any other process that may benefit from a multiply/accumulate operation. In particular, the multiply/accumulate operation may be used to implement a dot product or matrix multiplication in any context in which these operations are performed.

Referring to FIG. 3, the bit positions for each value stored in the buffers 200, 202 may define a high portion and a low portion. The high portion has higher magnitude (e.g., higher significance) than the low portion and does not overlap the low portion. The number of bits in the high portion and the number of bits in the low portion is equal to the number of bits in each value stored in the buffers 200, 202. For example, where the buffers 200, 202 store 16 bit values, bit positions 8 through 15 may be the high portion and bit positions 0 through 7 may be the low portion, where bit position 0 is defined as the least significant bit (LSB).

The illustrated method 300 illustrates one approach for implementing a multiply/accumulate operation. For purposes of the following discussion, let $AH_i$ represent the high portion at buffer position i of the buffer 200. Let $BH_i$ represent the high portion at buffer position i of the buffer 202. Let $AL_i$ represent the low portion at buffer position i of the buffer 200. Let $BL_i$ represent the low portion at buffer position i of the buffer 202.

The method 300 may include performing 302 a multiply/accumulate operation of $AH_i$ and $BH_i$ for all buffer positions i. Specifically, the sequencer 204 may, for each value i from 0 to N−1, where N is the number of values to be processed, output $AH_i$ and $BH_i$ as arguments 206, 208 to be processed according to the pipeline 210. Accordingly the result stored in the accumulation buffer 216 following step 302 will be $\Sigma_{i=0}^{N-1} AH_i * BH_i$.

The method 300 may then include adding 304 the contents of the accumulation buffer 216 to contents of the group accumulation buffer 220 and writing the result of the addition to the group accumulation buffer 220. Prior to execution of the method 300, the group accumulation buffer 220 and accumulation buffer 216 may be initialized to zero such that step 304 includes simply writing the contents of the accumulation buffer 216 to the group accumulation buffer 220. As described below with respect to FIG. 5, writing may include shifting the contents of the accumulation buffer by the first width (e.g., 16 bits) prior to adding to account for the fact that the high portions $AH_i$ and $BH_i$ were processed.

The method 300 may include performing 306 a multiply/accumulate operation of $AH_i$ and $BL_i$ for all buffer positions i. Specifically, the sequencer 204 may, for each value i from 0 to N−1, where N is the number of values to be processed, output $AH_i$ and $BL_i$ as arguments 206, 208 to be processed according to the pipeline 210. Accordingly the result stored in the accumulation buffer 216 following step 306 will be $\Sigma_{i=0}^{N-1} AH_i * BL_i$.

The method 300 may then include adding 308 the contents of the accumulation buffer 216 to contents of the group accumulation buffer 220 and writing the result of the addition to the group accumulation buffer 220. Prior to execution of the method step 306, the accumulation buffer 216 may be initialized to zero. As described below with respect to FIG. 5, adding 308 may include shifting the contents of the accumulation buffer 216 by the second width (e.g., 8 bits) prior to adding to account for the fact that the high portions $AH_i$ were processed.

The method 300 may include performing 310 a multiply/accumulate operation of $AL_i$ and $BL_i$ for all buffer positions i. Specifically, the sequencer 204 may, for each value i from 0 to N−1, where N is the number of values to be processed, output $AL_i$ and $BL_i$ as arguments 206, 208 to be processed according to the pipeline 210. Accordingly the result stored in the accumulation buffer 216 following step 310 will be $\Sigma_{i=0}^{N-1} AL_i * BL_i$.

The method 300 may then include adding 312 the contents of the accumulation buffer 216 to contents of the group accumulation buffer 220 and writing the result of the addition to the group accumulation buffer 220. Prior to execution of the method step 310, the accumulation buffer 216 may be initialized to zero. As described below with respect to FIG. 5, adding 312 will not include shifting the contents of the accumulation buffer 216 since only the low precision portions $AL_i$, $BL_i$ were processed.

The method 300 may include performing 314 a multiply/accumulate operation of $AL_i$ and $BH_i$ for all buffer positions i. Specifically, the sequencer 204 may, for each value i from 0 to N−1, where N is the number of values to be processed, output $AL_i$ and $BH_i$ as arguments 206, 208 to be processed according to the pipeline 210. Accordingly the result stored in the accumulation buffer 216 following step 306 will be $\Sigma_{i=0}^{N-1} AL_i BH_i$.

The method 300 may then include adding 316 the contents of the accumulation buffer 216 to contents of the group accumulation buffer 220 and writing the result of the addition to the group accumulation buffer 220. Prior to execution of the method step 316, the accumulation buffer 216 may be initialized to zero. As described below with respect to FIG. 5, adding 316 may include shifting the contents of the accumulation buffer 216 by the second width (e.g., 8 bits) prior to adding to account for the fact that the high portions $BH_i$ were processed.

Following execution of the method 300, the group accumulation buffer 220 will store the result of performing a multiply/accumulate operations for all the values in buffer positions 0 to N−1 in the buffers 200, 202. Note that the ordering of steps 302, 306, 310, and 314 is arbitrary and these may be rearranged and substituted with for one another. Note likewise, that buffer positons 0 to N−1 are referred to but the starting address for this method and other methods described herein may be any position in memory defining the buffer.

FIG. 4 illustrates a more detailed method 400 for performing a multiply/accumulate operation for values having a first width using a computational pipeline 210 having a second width that is half of the first width.

The method 400 may include setting 402 the position of the first argument 206 to be low, i.e., the low portion of first values in the buffer 200. The method 400 may further include setting 404 the position of the second argument 208 to be low, i.e. the low portion of second values in the buffer 202. In this example, the low portions are processed first. This is exemplary only and starting with the high portions may also be performed.

The method 400 may include initializing 406 the current buffer position to zero and initializing the accumulator buffer 216 to zero.

The method 400 may then include performing 408 a multiply accumulate operation for the portions of the first values at the first argument position and the portions of the second values at the second argument positions. For example, step 408 may include using the computational pipeline 210 to perform the following operation:

$$\Sigma_{i=0}^{N-1} A_i[S(P1+1)-1:S*P1]*B_i[S(P2+1)-1:S*P2]$$

where:
P1=1 if first argument position is high; 0 if the first argument position is low.
P2=1 if second argument position is high; 0 if the second argument position is low.
S=the second width.

The computation of step 408 may be performed iteratively, e.g., starting with i=0, (a) performing multiplication $A_i[S(P1+1)-1:S*P1]*B_i[S(P2+1)-1:S*P2]$ to obtain a product, adding the product to the accumulation buffer 216 to obtain a sum, and writing the sum to the accumulation buffer 216 and (b) if i is not equal to N−1, incrementing i and repeating from (a).

The method 400 may then include adding 410 the contents of the accumulation buffer 216 to the contents of the group accumulation buffer 220 and writing the result of the addition to the group accumulation buffer 220. The method 400 may be preceded with initializing the group accumulation buffer 220 to zero.

The method 400 may then include evaluating 414 whether the second argument position is high, if not, the second argument position 412 is set to high and processing continues at step 406. If so, the method 400 may include evaluating 416 whether the first argument position is high, if not, the first argument position is set 418 to high, and processing continues at step 404. If so, the method ends and the value stored in the group accumulation buffer 220 is the multiply/accumulation result for the values 0 to N−1 in the buffers 200, 202. As noted above, 0 to N−1 is exemplary only and any range of memory addresses may be processed according to the method 400. Note further that the range of addresses of the buffer 200 may be the same as or different from the range of addresses in the buffer 202 that are processed according to the method 400.

Referring to FIG. 5, the illustrated method 500 may be used when adding the contents of the accumulation buffer 216 to the contents of the group accumulation buffer 220. The method 500 may include evaluating 502 whether both the first and second argument positions are high. If so, the contents of the accumulation buffer 216 are left shifted 504 (assuming leftmost bit is most significant) by the first width, e.g., 16 bits, and the value as shifted at step 504 is then added 506 to the contents of the group accumulation buffer 220 and the result of the addition 506 is written to the group accumulation buffer 220.

The method 500 may include evaluating 508 whether both only one of first and second argument positions are high. If so, the contents of the accumulation buffer 216 are left shifted 510 (assuming leftmost bit is most significant) by the second width, e.g., 8 bits, and the value as shifted at step 510 is then added 506 to the contents of the group accumulation buffer 220 and the result of the addition 506 is written to the group accumulation buffer 220.

If neither of the argument positions is high, then no shift is performed and step 506 is performed on the un-shifted contents of the accumulation buffer 216.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:

1. A device comprising:
a first input buffer configured to store first values having a first width;
a second input buffer configured to store second values having the first width;
a multiply/accumulate circuit configured to perform a multiply/accumulate operation on input arguments having a second width that is half the first width;
a group accumulator configured to accumulate an output the multiply/accumulate circuit;
a sequencer configured to, for each combination of a plurality of combinations of portion positions that are possible for the first input buffer and the second input buffer:
(a) for the each combination of portion positions, input portions of the first values and the second values corresponding to the each combination of portion positions to the multiplier accumulate circuit; and
(c) invoke the group accumulator to add the output of the multiply/accumulate circuit to contents of a group accumulation buffer;
wherein the portion positions for the first input buffer and the second input buffer include:
a high portion and a low portion, the high portion having higher magnitude than the low portion, the high portion and low portion being non-overlapping and a sum of a number of bits in the high portion and a number of bits in the low portion is equal to a number of bits in the first width;
wherein the plurality of combinations of portion positions that are possible for the first input buffer and the second input buffer include:
the high portion of the first values in the first input buffer and the high portion of the second values in the second input buffer;
the low portion of the first values in the first input buffer and the high portion of the second values in the second input buffer;
the low portion of the first values in the first input buffer and the low portion of the second values in the second input buffer; and
the high portion of the first values in the first input buffer and the low portion of the second values in the second input buffer;
wherein the second width is half the first width;
wherein the group accumulator is further configured to:
when the portion positions for the first input buffer and the second input buffer in the each combination include the high portion for the first input buffer and the high portion for the second input buffer, shift the output of the multiply/accumulate circuit by the first width to obtain a shifted output and add the shifted output to the contents of the group accumulation buffer; and when the portion positions for the first input buffer and the second input buffer in the each combination include the high portion for only one of the first input buffer and the second input buffer, shift the output of the multiply/accumulate circuit by the second width to obtain a shifted output and add the shifted output to the contents of the group accumulation buffer.

2. The device of claim 1, wherein the first width is 16 bits and the second width is 8 bits.

3. The device of claim 2, wherein the group accumulation buffer has a width of 48 bits.

4. The device of claim 1, further comprising a controller programmed to implement a convolution neural network using the first input buffer, multiply/accumulate circuit, sequencer, and group accumulator.

5. The device of claim 1, further comprising a graphics processing unit including the first input buffer, multiply/accumulate circuit, sequencer, and group accumulator.

6. The device of claim 1, wherein the multiply/accumulate circuit is a first multiply/accumulate circuit, the device further comprising a plurality of multiply/accumulate circuits including the first multiply/accumulate circuit.

7. A method comprising:
providing a first input buffer configured to store first values having a first width;
providing a second input buffer configured to store second values having the first width;
performing a multiply/accumulate operation on high portions of the first values and high portions of the second values using a computational pipeline having a second width to obtain a first intermediate accumulation;
increasing a group accumulation value stored in a group accumulation buffer according to the first intermediate accumulation;
performing a multiply/accumulate operation on high portions of the first values and low portions of the second values to obtain a second intermediate accumulation;
increasing the group accumulation value stored in the group accumulation buffer according to the second intermediate accumulation;
performing a multiply/accumulate operation on low portions of the first values and low portions of the second values to obtain a third intermediate accumulation;
increasing the group accumulation value stored in the group accumulation buffer according to the third intermediate accumulation;

performing a multiply/accumulate operation on low portions of the first values and high portions of the second values to obtain a fourth intermediate accumulation; and
increasing the group accumulation value stored in the group accumulation buffer according to the fourth intermediate accumulation;
wherein the high portions of each of the first values and the second values has higher magnitude than the low portions of each of the first values and the second values, the high portions and low portions of each of the first values and the second values are non-overlapping and a sum of a number of bits in the high portions and a number of bits in the low portions is equal to a number of bits in the first width; and
wherein increasing the group accumulation value stored in the group accumulation buffer according to the first intermediate accumulation comprises:
increasing the group accumulation value stored in the group accumulation buffer by the first intermediate accumulation left shifted by the first width.

8. The method of claim 7, wherein the second width is half the first width.

9. The method of claim 8, wherein the first width is 16 bits and the second width is 8 bits.

10. The method of claim 9, wherein the group accumulation buffer has a width of 48 bits.

11. The method of claim 7, wherein increasing the group accumulation value stored in the group accumulation buffer according to the second intermediate accumulation comprises:
increasing the group accumulation value stored in the group accumulation buffer by the second intermediate accumulation left shifted by the second width.

12. The method of claim 11, wherein increasing the group accumulation value stored in the group accumulation buffer according to the third intermediate accumulation comprises:
increasing the group accumulation value stored in the group accumulation buffer by the third intermediate accumulation without first left shifting the third intermediate accumulation.

13. The method of claim 7, further comprising implementing a convolution neural network (CNN) using the group accumulation value.

14. The method of claim 13, wherein the first values are coefficients of a CNN and the second values are activation values processed according to the CNN.

* * * * *